US009082225B2

(12) United States Patent
Hong (10) Patent No.: US 9,082,225 B2
(45) Date of Patent: Jul. 14, 2015

(54) METHOD, APPARATUS AND SYSTEM FOR ADJUSTING STEREOSCOPIC IMAGE, TELEVISION SET AND STEREOSCOPIC GLASSES (75) Inventor: Ye Hong, Shandong (CN)

(73) Assignee: Hisense Hiview Tech Co., Ltd. (CN)

( * ) Notice: Subject to any disclaimer, the term of this patent is extended or adjusted under 35 U.S.C. 154(b) by 288 days.

(21) Appl. No.: 13/701,907

(22) PCT Filed: Apr. 6, 2011

(86) PCT No.: PCT/CN2011/072476
§ 371 (c)(1),
(2), (4) Date: Dec. 4, 2012

(87) PCT Pub. No.: WO2012/136002
PCT Pub. Date: Oct. 11, 2012

(65) Prior Publication Data
US 2013/0088488 A1 Apr. 11, 2013

(51) Int. Cl.
G06T 15/20 (2011.01)
H04N 13/00 (2006.01)
H04N 13/04 (2006.01)
(52) U.S. Cl.
CPC .......... G06T 15/205 (2013.01); H04N 13/0018 (2013.01); H04N 13/0033 (2013.01); H04N 13/0425 (2013.01); H04N 13/0429 (2013.01); H04N 13/0468 (2013.01)
(58) Field of Classification Search
CPC ............... G06T 15/20; G06T 15/205
See application file for complete search history.

(56) References Cited

U.S. PATENT DOCUMENTS

| 2004/0183746 A1* | 9/2004 | Tomisawa ................. 345/1.1 |
| 2005/0020279 A1* | 1/2005 | Markhovsky et al. ..... 455/456.1 |
| 2005/0286125 A1 | 12/2005 | Sundstrom et al. |
| 2010/0091098 A1 | 4/2010 | Yoshifuji et al. |
| 2010/0098366 A1* | 4/2010 | Sato et al. ................. 384/530 |

FOREIGN PATENT DOCUMENTS

| CN | 1949823 A | 4/2007 |
| JP | 2008-229000 A | 10/2008 |
| WO | 2010/146384 | 12/2010 |

OTHER PUBLICATIONS

Patent Examination Report No. 1 from Australian Patent Office dated Sep. 12, 2013 re Application No. 2011364912.

* cited by examiner

Primary Examiner — Mark Zimmerman
Assistant Examiner — Michelle Chin
(74) Attorney, Agent, or Firm — DLA Piper LLP (US)

(57) ABSTRACT

The invention discloses a method, apparatus and system for adjusting a stereoscopic image, a television set and stereoscopic glasses, wherein the method includes: receiving and displaying, by a display terminal, a three-dimensional stereoscopic image; transmitting, by a distance sensor, a sensing signal and obtaining a sighting distance between the display terminal and a user according to the sensing signal; and adjusting the size of the three-dimensional stereoscopic image according to the sighting distance. In the invention, stereoscopic geometrical distortion can be alleviated or even eliminated to thereby improve real experience feelings of watching the 3D stereoscopic display.

14 Claims, 3 Drawing Sheets

Line through furthest point    Line through nearest point

METHOD, APPARATUS AND SYSTEM FOR ADJUSTING STEREOSCOPIC IMAGE, TELEVISION SET AND STEREOSCOPIC GLASSES

CROSS REFERENCE TO RELATED APPLICATIONS

The present application is a US National Stage of International Application No. PCT/CN2011/072476, filed on 6 Apr. 2011, and designating the United States.

FIELD OF THE INVENTION

The present invention relates to the field of electric appliances and particularly to a method, apparatus and system for adjusting a stereoscopic image, a television set and stereoscopic glasses.

BACKGROUND OF THE INVENTION

Three-dimensional (3D) stereoscopic display technologies are currently under rapid development, and under the principle of 3D stereoscopic vision, two slightly different images are transmitted respectively to left and right eyes and extended reversely by the human eyes until the images are superposed and a stereoscopic "phantom" is observed to thereby generate stereoscopic sensation. Due to rapid development of the technologies, their corresponding standards and particularly test and evaluation standards, are relatively immature and fail to guide the evaluation of a 3D stereoscopic display effect during design and development of a 3D stereoscopic display product.

An experience purpose of 3D stereoscopic display is to generate "artificial" immersive experience feelings. Under the principle of 3D stereoscopic vision, two slightly different images are transmitted respectively to left and right eyes and extended reversely by the human eyes until the images are superposed and a stereoscopic "phantom" is observed to thereby generate stereoscopic sensation.

A stereoscopic phantom with a real scale has to be generated from the 3D stereoscopic display taking into account the following factors:

Firstly the size of a display screen greatly ranges from 26 inches to 32 inches, to 42 inches, to 50 inches, to 60 inches, to the size of a movie screen, and the entire screen is typically populated with the contents of an image. The image forms a phantom through both eyes, so the size of the phantom is proportional to the size of the screen and thus fails to be uniform. In this respect, if an optimum 3D display effect can be achieved on a 50-inch screen, there may be a sense of watching "Lilliput" on a 32-inch screen and watching "Brobdingnag" on a 70-inch screen.

Secondly a cameraman may embody artistic connotation from special angles of view such as bird's-eye view, bottom view and the like during photographing for the purpose of artistic process, and in this respect, whether to perceive the size of the phantom from the human vision perspective has become less important.

Thus the real scale of the stereoscopic phantom is more important then the real size thereof in the 3D stereoscopic display.

Figure 1:
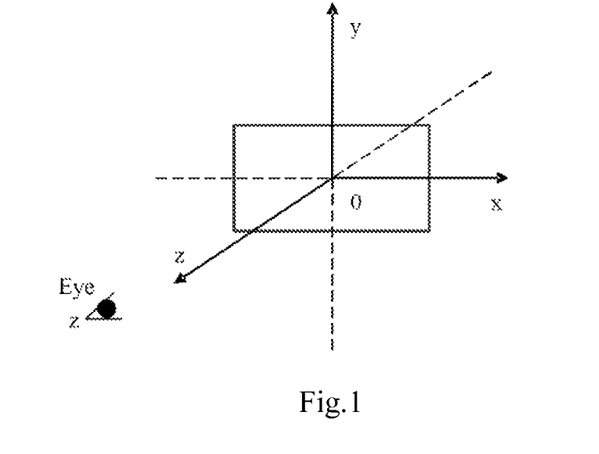
FIG. 1 is a schematic diagram of watching a stereoscopic image according to the related prior art.

FIG. 1 is a schematic diagram of watching a stereoscopic image according to the related prior art. As illustrated in FIG. 1, when watching 3D stereoscopic display, human eyes typically are focused onto the perpendicular bisector of a screen. That is, the line of sight of the human eyes is perpendicular to the plane of the screen and projected thereon just at the central point of the screen.

Normally the scale distortion will not appear on the plane of a 2D screen perpendicular to the line of sight (as mentioned, the entire screen has been populated with the image, so the image will not be distorted in the 2D direction x-y as long as the aspect ratio of the screen, such as 16:9, keeps unchanged). However a 3D image may be, geometrically distorted in the direction z.

As illustrated in FIG. 1, the phantom may vary in location and size in the direction z when the human eyes move along the axis z. Specifically the phantom will be compressed in the direction z when the human eyes get close to the point "0"; and the phantom will be expanded in the direction z when the human eyes get away from the point "0". The ratio of the compression to the expansion of the phantom is equal to the ratio of the compression to the expansion of the human eyes and the screen.

An effective solution has been absent so far to the problems in the prior art of geometrical distortion of the 3D stereoscopic image and a degraded effect of watching the 3D stereoscopic display due to restrictions of environmental factors and the like.

SUMMARY OF THE INVENTION

A main object of the invention is to provide a method, apparatus and system for adjusting a stereoscopic image, a television set and stereoscopic glasses so as to address the problems in the prior art of geometrical distortion of a 3D stereoscopic image and a degraded effect of watching a 3D stereoscopic display due to restrictions of environmental factors and the like.

In order to attain the foregoing object, according to an aspect of the invention, a method for adjusting a stereoscopic image is provided.

The method for adjusting a stereoscopic image according to the invention includes: receiving and displaying, by a display terminal, a three-dimensional stereoscopic image; obtaining a sighting distance between the display terminal and a user; and adjusting the size of the three-dimensional stereoscopic image according to the sighting distance.

In order to attain the foregoing object, according to another aspect of the invention, an apparatus for adjusting a stereoscopic image is provided.

The apparatus for adjusting a stereoscopic image according to the invention includes: a receiving module configured to receive and display a three-dimensional stereoscopic image; a detecting module configured to transmit a sensing signal and to obtain a sighting distance between a display terminal and a user according to the sensing signal; and an adjusting module configured to adjust the size of the three-dimensional stereoscopic image according to the sighting distance.

In order to attain the foregoing object, according to a further aspect of the invention, a system for adjusting a stereoscopic image is provided.

The system for adjusting a stereoscopic image according to the invention includes: a display terminal configured to receive and display a three-dimensional stereoscopic image, to transmit a sensing signal and to obtain a sighting distance according to the sensing signal to adjust the size of the three-dimensional stereoscopic image; and stereoscopic glasses configured to receive the sensing signal and to return a feedback signal of the sensing signal to the display terminal.

In order to attain the foregoing object, according to still another aspect of the invention, a television set including any one of the foregoing apparatuses for adjusting a stereoscopic image is provided.

In order to attain the foregoing object, according to still another aspect of the invention, stereoscopic glasses are provided, the stereoscopic glasses including: a distance sensor configured to detect a sighting distance between a display terminal and a user; and a processing device configured to send out prompt information according to a result of comparing the sighting distance with an optimum sighting distance to prompt the user to adjust the sighting distance.

In the invention, a display terminal receives and displays a three-dimensional stereoscopic image; a distance sensor transmits a sensing signal and obtains a sighting distance between the display terminal and a user according to the sensing signal; and the size of the three-dimensional stereoscopic image is adjusted according to the sighting distance, thereby addressing the problems in the prior art of geometrical distortion of the 3D stereoscopic image and a degraded effect of watching the 3D stereoscopic display due to restrictions of environmental factors and the like, and achieving an effect of alleviating or even eliminating stereoscopic geometrical distortion and of improving real experience feelings of watching the 3D stereoscopic display.

BRIEF DESCRIPTION OF THE DRAWINGS

The drawings described herein serve to provide further understanding of the invention and constitutes a part of this application, and illustrative embodiments of the invention and the description thereof serve to explain but not limit unduly the invention. In the drawings.

DETAILED DESCRIPTION OF THE EMBODIMENTS

It shall be noted that embodiments in this application and features in the embodiments can be combined with each other without any conflict. The invention will be described in detail below with reference to the drawings and in combination with the embodiments.

Figure 2:
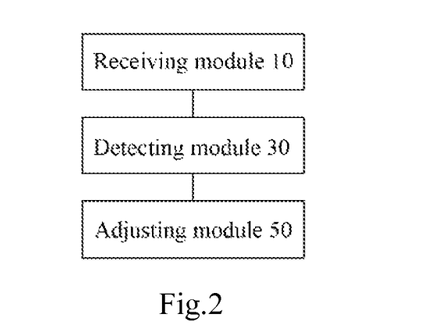
FIG. 2 is a structure schematic diagram of an apparatus for adjusting a three-dimensional stereoscopic image according to an embodiment of the invention.

The invention provides an apparatus for adjusting a stereoscopic image. FIG. 2 is a structure schematic diagram of an apparatus for adjusting a three-dimensional stereoscopic image according to an embodiment of the invention. As illustrated in FIG. 2, the apparatus includes: a receiving module 10 configured to receive and display a three-dimensional stereoscopic image; a detecting module 30 configured to transmit a sensing signal and to obtain a sighting distance between a display terminal and a user according to the sensing signal; and an adjusting module 50 configured to adjust the size of the three-dimensional stereoscopic image according to the sighting distance.

In the foregoing embodiment of the invention, the sighting distance between the user watching the three-dimensional stereoscopic image and the display terminal is obtained by the detecting module 30, and the size of the three-dimensional stereoscopic image is adjusted according to the obtained sighting distance, thus achieving a stereoscopic display effect with stereoscopic geometrical distortion alleviated or even eliminated to thereby improve the 3D stereoscopic display effect and also the real experience feelings of the user watching the 3D stereoscopic display.

The adjusting module 50 in the foregoing embodiment of the invention can include: a first judging module configured to judge whether a difference between the sighting distance and an optimum sighting distance is within a predetermined range, to maintain the three-dimensional stereoscopic image through a maintaining module when the difference is within the predetermined range, and to adjust the size of the three-dimensional stereoscopic image according to the optimum sighting distance through a first adjusting module when the difference is not within the predetermined range; or a second judging module configured to judge whether the sighting distance is equal to an optimum sighting distance, to maintain the three-dimensional stereoscopic image through a maintaining module when they are equal, otherwise to adjust the size of the three-dimensional stereoscopic image according to the optimum sighting distance through a second adjusting module when they are unequal. The first judging module or the second judging module in the adjusting module 50 in this embodiment determines a point at which a 3D view is located if an optimum sighting distance is to be obtained. The optimum sighting distance refers to a distance at which when human eyes watch the 3D stereoscopic image, a stereoscopic image is not distorted. The image will be distorted when watched at positions except this point, for example, a cube will turn to a cuboid during rotation.

In summary, the viewing distance of the user influences stereoscopic geometrical distortion and the 3D stereoscopic display effect, and in order to alleviate or even eliminate stereoscopic geometrical distortion, the size of the image can be adjusted according to the optimum sighting distance, and generally geometric scaling technologies are adopted so that the optimum sighting distance is obtained by adjusting the size of the image at the current sighting distance of the user.

Preferably the first judging module or the second judging module can further includes: a comparing module configured to compare the sighting distance with the optimum sighting distance in size to obtain a comparison result; a scaling-up module configured to scale up the three-dimensional stereoscopic image according to a scaling formula when the comparison result indicates that the sighting distance is larger than the optimum sighting distance; and a scaling-down module configured to scale down the three-dimensional stereoscopic image according to the scaling formula when the comparison result indicates that the sighting distance is smaller than the optimum sighting distance.

Figure 3:
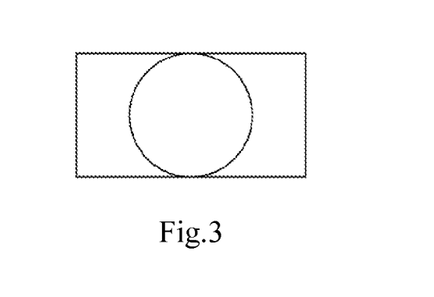
FIG. 3 is a schematic diagram of a stereoscopic test image according to the embodiment illustrated in FIG. 1.

Specifically a display terminal proposed in this patent application can measure an optimum sighting distance by the following process:

Firstly a stereoscopic pattern card is designed (specific manufacturing methods for shutter, polarizing, red-and-blue, etc. types of 3D test pattern cards are different, but the principle can be applied thereto). FIG. 3 is a schematic diagram of a stereoscopic test image according to the embodiment illustrated in FIG. 1. As illustrated in FIG. 3, the pattern card designed in the invention can be a translucent sphere of which the center is on the plane of a screen. The diameter in the x-y axis plane is equal to the height of the screen, and the diameter in the axis z shall be equal to the diameter in the plane x-y when a user watches at a distance which is three times the height of the screen (for a 16:9 display screen). The above is calibration preparation process, that is, the optimum sighting distance is an optimum sighting distance as defined by the Consultative Committee of International Radio (CCIR) for a plat panel TV: a display effect of a plat panel TV system shall be equivalent or approximate to a sense of immediacy of a normal sight individual watching an original visual scene or a presentation when the viewing distance is three times the height of the screen.

Then the depths of field of the nearest point (out of the screen) and the furthest point (into the screen) can be measured to thereby obtain the difference between the depths of field, i.e., the diameter of the sphere in the axis z, and the sighting distance can be adjusted taking the diameter of the sphere in the plane x-y as a reference (the diameter in the axis x shall be equal to the diameter in the axis y because there is no distortion in the perpendicular directions) until the diameter of the sphere in the axis z is equal to the diameter of the sphere in the plane x-y.

Figure 4:
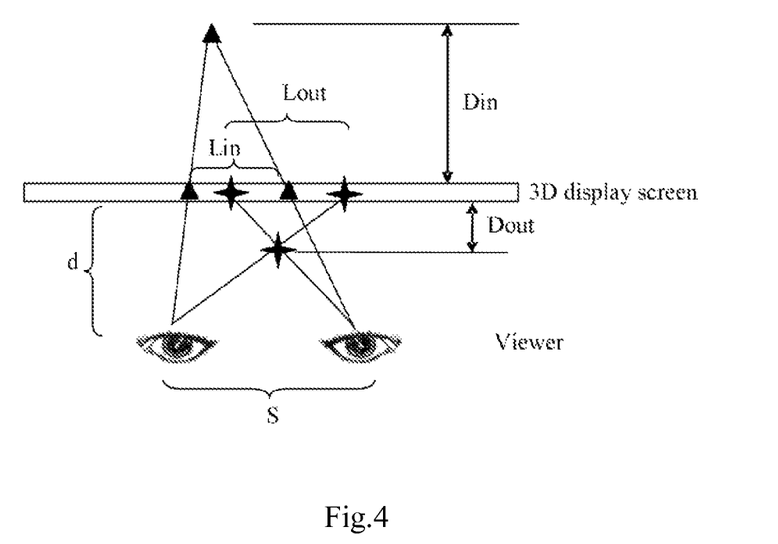
FIG. 4 is a schematic diagram of a viewer viewing the 3D stereoscopic image according to the embodiment illustrated in FIG. 1.

FIG. 4 is a schematic diagram of the viewer viewing the 3D stereoscopic image according to the embodiment illustrated in FIG. 1. As illustrated in FIG. 4, the parallax distances of the image on the screen in the left and right eyes are represented as lout (out of the screen) and lin (into the screen). d stands for the sighting distance, Dout and Din represent the depth of field out of the screen (the distance between a phantom out of the screen and the display screen) and the depth of field into the screen (the distance between a phantom into the screen and the display screen) respectively, and S represents the distance between the two eyes (typically around 65 mm), and then:

$$l\mathrm{out}/D\mathrm{out}=S/(d-D\mathrm{out})=(S+l\mathrm{out})/d$$

$$l\mathrm{in}/D\mathrm{in}=S/(d+D\mathrm{in})=(S-l\mathrm{in})/d$$

Noted the respective variables in the foregoing formulas have positive values. The two formulas can be unified into one formula if Dout and Din are defined respectively as being positive and negative. The two formulas are applied herein for the sake of convenience.

As can be apparent from the foregoing principle of an optimum sighting distance, d shall be three times the height of the screen, and the diameter of the sphere is equal to the height of the screen during making of the stereoscopic spherical pattern card. Let the diameter of the sphere be D, and then Dout=Din=D; d=3*2*Dout=3*2*Din=6*D.

Wherein if S=65 mm, then lout=S*Dout/(d−Dout)=65*D/(6*D−D)=13 mm, and lin=S*Din/(d+Dout)=65*D/(6*D+D)=9.3 mm. Specifically a developer can make a stereoscopic spherical pattern card according to the foregoing formulas. However a signal source and the display screen fail to be unified completely, and there is no dimension concept for the signal source which is represented in pixels.

Taking a predominating 55-inch 16:9 1080P television set as a criterion, lout of 13 mm and lin of 9.3 mm correspond respectively to 11 pixels and 8 pixels. Thus a simplified 3D test pattern card can be made hereupon.

In the foregoing embodiment of the invention, the depth of field can be measured in a "stereoscopic ruler" method. As illustrated in FIG. 3 and FIG. 4, this method is detailed as follows:

For a point out of the screen, i.e., a quadrangle in the figure above, dout can be measured directly with a flexible ruler. The human eyes shall be immobilized in location instead of moving during measurement. The human eyes are typically focused onto the perpendicular bisector of the screen. That is, the line of sight of the human eyes is perpendicular to the plane of the screen and projected thereon just at the central point of the screen. The measurement zero point is located at the projection point of the phantom on the plane of the screen when a flexible ruler is used. A mark can be positioned with a small and thin marker, e.g., a pen-point, and the distance between the pen-point and the screen can be measured when the pen-point and the phantom coincide.

It is often not easy to judge the coincidence of the mark with the phantom. At this time, monocular judgment can be made: one eye is closed, and the mark and an objective image (at this time, there is no stereoscopic phantom but a monocular objective image) are aimed onto a straight line only with the other eye; and then the one eye takes place of the other eye, and the coincidence of the mark with the phantom can be judged if the mark and the objective image are still on the same straight line.

Since the human eyes are sensitive to a moving object and the depth of field does not vary with transverse movement (parallel to the plane of the screen) of the human eyes, the depth of field of the phantom and the coincidence thereof with the mark can alternatively be judged by left-to-right and right-to-left translation of the human eyes.

For a point into the screen, i.e., a triangle in FIG. 4, the human eyes shall be fixed on the perpendicular bisector through the midpoint of the top edge of the screen.

The measurement zero point is located at the midpoint of the phantom on the top edge of the screen when a flexible ruler is used. At this time visibility of both the phantom and the flexible ruler (or a mark) is kept to the largest extent. Then the distance between the mark, e.g., a pen-point, and the screen is measured when the mark and the phantom coincide.

For evaluation of the 3D stereoscopic display effect in the invention, the measurement method is performed from the vision perspective of a viewer other than exiting objective measurement indexes including brightness, crosstalk, etc. In specific use, stereoscopic geometrical distortion can be used as a measurement item in addition to the foregoing objective measurement indexes to thereby improve an experience of the user for the 3D stereoscopic display.

Figure 6:
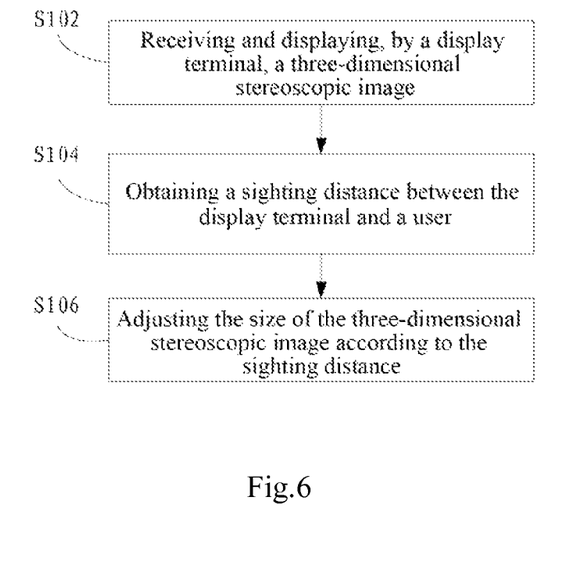
FIG. 6 is an operational flow chart of a method for adjusting a three-dimensional stereoscopic image according to an embodiment of the invention.

The invention further provides a method for adjusting a stereoscopic image. FIG. 6 is an operational flow chart of a method for adjusting a three-dimensional stereoscopic image according to an embodiment of the invention. As illustrated in FIG. 6, the method includes the steps of:

The step S102 is to receive and display a three-dimensional stereoscopic image through a display terminal.

The step S104 is to transmit a sensing signal through a distance sensor and to obtain a sighting distance between the display terminal and a user according to the sensing signal.

The step S106 is to adjust the size of the three-dimensional stereoscopic image according to the sighting distance.

In the foregoing embodiment of the invention, the sighting distance between the user watching the three-dimensional stereoscopic image and the display terminal is obtained, and the size of the three-dimensional stereoscopic image is adjusted according to the obtained sighting distance, thus achieving a stereoscopic display effect with stereoscopic geometrical distortion alleviated or even eliminated to thereby improve the 3D stereoscopic display effect and also the real experience feelings of the user watching the 3D stereoscopic display.

In the foregoing embodiment of the invention, the step of adjusting the size of the three-dimensional stereoscopic image according to the sighting distance can include: judging whether a difference between the sighting distance and an optimum sighting distance is within a predetermined range; maintaining the three-dimensional stereoscopic image when the difference is within the predetermined range, and adjusting the size of the three-dimensional stereoscopic image according to the optimum sighting distance when the difference is not within the predetermined range. In this embodiment, wide-range distortion adjusting is performed, that is, when the sighting distance is different from the optimum sighting distance, the size of the three-dimensional image may not be adjusted if the error is within a predetermined operational range, thereby improving an experience of the user.

In the foregoing embodiment of the invention, the step of adjusting the size of the three-dimensional stereoscopic image according to the sighting distance can alternatively include: judging whether the sighting distance is equal to an optimum sighting distance; maintaining the three-dimensional stereoscopic image when they are equal, otherwise adjusting the size of the three-dimensional stereoscopic image according to the optimum sighting distance when they are unequal. In the foregoing embodiment of the invention, the sighting distance of the user can be made precise to the optimum sighting distance to thereby completely eliminate distortion of the three-dimensional image.

The step of adjusting the size of the three-dimensional stereoscopic image according to the optimum sighting distance in the foregoing respective embodiments of the invention can include: comparing the sighting distance with the optimum sighting distance in size; scaling up the three-dimensional stereoscopic image according to a scaling formula when the sighting distance is larger than the optimum sighting distance; and scaling down the three-dimensional stereoscopic image according to the scaling formula when the sighting distance is smaller than the optimum sighting distance, wherein when the three-dimensional stereoscopic image is a sphere, the optimum sighting distance d can be obtained in the formula of:

$$\begin{cases} Dout = Din = D \\ d = 6D, \end{cases}$$

Wherein Dout represents the depth of field out of the screen, Din represents the depth of field into the screen, and D represents the radius of the sphere. In a specific practical application, a developer can obtain an optimum sighting distance taking a 3D spherical image as a criterion, and this optimum sighting distance can be used as an optimum sighting distance for watching other three-dimensional stereoscopic images, that is, the optimum sighting distance can be calculated in the simplest way, and then the user can watch the other stereoscopic images according to this optimum sighting distance, thus lowering the cost of development and improving the operational efficiency and accuracy of the developer.

Preferably the scaling formula mentioned in the foregoing embodiment is: Scaling factor=Sighting Distance/Optimum Sighting Distance.

A simplified 3D test pattern card can be made as an extension of this method.

Figure 5:
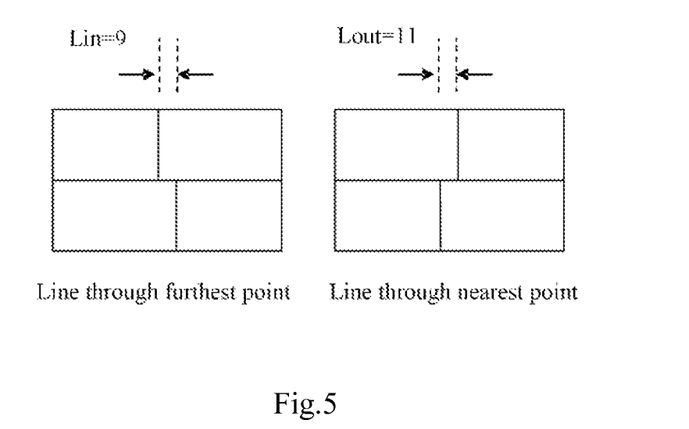
FIG. 5 is a structure schematic diagram of cross sections of obtaining the depths of field of the stereoscopic test image according to the embodiment illustrated in FIG. 4.

FIG. 5 is a structure schematic diagram of cross sections of obtaining the depths of field of the stereoscopic test image according to the embodiment illustrated in FIG. 4. In the invention, as illustrated in FIG. 4, when a 3D test pattern card is made, only the nearest point and the furthest point of a sphere can be made into the 3D test pattern card, that is, the depths of field are measured with the points instead of the sphere. In view of the points being too small to be convenient and of consistency of human eyes in the direction y, straight lines in the direction y through the nearest point and the furthest point of the sphere can further be made to measure the depths of field. Finally two test pattern cards can be formed for measurement (the top-bottom stereoscopic format is adopted for the sake of convenient description, and the invention will be not limited to a specific stereoscopic format because the majority of exiting 3D decoders are full-format decoders).

The depths of field of the line through the nearest point and of the line through the furthest point are measured directly. Distortion is adjusted by comparing directly the measured depths of field with standard depths of field and adjusting the sighting distance repeatedly until it is equal to a standard sighting distance.

When calibration is performed with the foregoing signal source, as can be apparent from the foregoing formulas, the depth of field out of the screen is Dout=lout*d/(S+lout), and the depth of field into the screen is Din=lin*d/(S−lin), and for the three-dimensional stereoscopic image of the sphere in the invention, the sighting distance d of the user is the optimum sighting distance when Dout=Din=D is satisfied, so lout*d/(S+lout)=lin*d/(S−lin)=D. As can be apparent from the foregoing analysis, the image can be reproduced without distortion on the display terminal only if this equation is satisfied.

In the foregoing embodiment of the invention, when the stereoscopic image is geometrically distorted, the correction can be achieved by adjusting the distance of the entire image in the left and right eyes. It is not possible to adjust lout and lin separately for the same stereoscopic image in the left and right eyes, that is, when lout is increased by x, lin is also increased by x, and vice versa. Thus in the invention, the correction can be achieved by adjusting the scaling factor of the entire image in the left and right eyes to thereby improve ease of use for the user, so that a television set can be provided with intelligent adjusting of the optimum sighting distance between the user and the television set to thereby improve an experience of the user watching the three-dimensional image.

The invention can provide a system for adjusting a stereoscopic image, and the system can include: a display terminal configured to receive and display a three-dimensional stereoscopic image, to transmit a sensing signal and to obtain a sighting distance according to the sensing signal to adjust the size of the three-dimensional stereoscopic image; and stereoscopic glasses configured to receive the sensing signal and to return a feedback signal of the sensing signal to the display terminal.

Preferably the display terminal can include: a distance sensor configured to transmit the sensing signal to the stereoscopic glasses and to receive the feedback signal returned from the stereoscopic glasses; and a processor configured to calculate an interval of time between transmitting the sensing signal and receiving the feedback signal by the distance sensor to obtain the sighting distance, and to adjust the size of the three-dimensional stereoscopic image according to the sighting distance. In the foregoing system, both the size of the stereoscopic image can be adjusted and the optimum sighting distance can be obtained by adopting the embodiment of the method for adjusting a three-dimensional stereoscopic image illustrated in FIG. 6.

In order to attain the foregoing object, according to still another aspect of the invention, a television set including any one of the foregoing apparatuses for adjusting a stereoscopic image is provided.

In order to attain the foregoing object, according to still another aspect of the invention, stereoscopic glasses are provided, the stereoscopic glasses including: a distance sensor configured to detect a sighting distance between a display terminal and a user; and a processing device configured to send out prompt information according to a result of comparing the sighting distance with an optimum sighting distance to prompt the user to adjust the sighting distance.

Preferably the processing device can include: a calculator configured to calculate a difference between the sighting distance and the optimum sighting distance; and a voice device configured to send out a voice prompt of the difference when the difference is out of a predetermined range or the difference is not zero. In this solution, the stereoscopic glasses can be enabled to prompt in a language way the user of the obtained calculating results of the optimum sighting distance and the current sighting distance through the simple voice prompting device to indicate whether he is located at an appropriate viewing location, so the user can adjust his location relative to a television set according to the prompt information and can also control whether to enable this prompt function.

Furthermore, the processing device of the stereoscopic glasses can further include: a calculator configured to calculate a difference between the sighting distance and the optimum sighting distance; and a display device configured to display the difference when the difference is out of a predetermined range or the difference is not zero. In this solution, the stereoscopic glasses can be enabled to display the obtained calculating results of the optimum sighting distance and the current sighting distance through the display device embodied in software or hardware (built inside or outside the stereoscopic glasses), and the device prompts the user whether he is located at an appropriate viewing location from the perspective of the sighting distance, so the user can adjust his location relative to a television set according to the prompt information and can also control whether to enable this prompt function.

Specifically, in practical application process, there are two source ways of the stereoscopic image: one way is to replay the image or video (e.g., Blue Ray DVD) and the other way is to generate a graph calculated in real time (e.g., a 3D virtual reality game). For replaying, in addition to keeping to the largest extent play parameters unchanged for alleviated distortion, a distance sensor can also be arranged on the stereoscopic glasses or the television set, and according to the detected distance, the user can be prompted to approach in a display or voice way when the sighting distance of the user is larger than the optimum sighting distance; and the display scale of the image is reduced automatically to alleviate or even eliminate the distortion effect when the sighting distance of the user is smaller than the optimum sighting distance.

Furthermore, in the invention, the display contents of the image can also be adjusted according to distance parameters measured by using a powerful real-time calculation capability of the computer in addition to the additional distance sensor. This approach is intended for a three-dimensional stereoscopic image generated in real time instead of a pre-recorded image, so lout and lin in the equation of lout*d/(S+lout)=lin*d/(S−lin)=D can be adjusted respectively to achieve an optimum stereoscopic effect.

In conclusion, this patent application proposes a method for making a stereoscopic test pattern card and correspondingly provides methods of correction in 3D generation and in 3D display.

As can be apparent from the foregoing description of the embodiments, the invention achieves the following technical effects: the depths of field of a 3D stereoscopic phantom are measured and parametric indexes are displayed in a standard format to thereby improve the consistency of a stereoscopic display effect. Also the indexes of depths of field are added and 3D display parameters are refined to thereby offer a criterion of 3D effect evaluation.

As shall be apparent to those skilled in the art, the foregoing respective modules or respective steps of the invention can be embodied in a general-purpose computing device, and they can be centralized on a single computing device or distributed across a network composed of a plurality of computing devices, and optionally they can be embodied in program codes executable by the computing device(s) so that they can be stored in a storage device for execution by the computing device(s) or they can be fabricated respectively as a plurality of integrated circuit modules or more than one module or step among them can be fabricated as a single integrated circuit module. Accordingly the invention will not be limited to any specific combination of hardware and software.

The foregoing description is merely the preferred embodiments of the invention but not intended to limit the invention, and various possible modifications and variations to the invention will be apparent to those skilled in the art. Any modifications, equivalent substitutions, adaptations, etc., made without departing from the spirit and principle of the invention shall be contained in the claimed scope of the invention.

The invention claimed is:

1. A method for adjusting a stereoscopic image, comprising:
   receiving and displaying, by a display terminal, a three-dimensional stereoscopic image;
   obtaining a sighting distance between the display terminal and a user; and
   adjusting the size of the three-dimensional stereoscopic image according to the sighting distance;
   wherein when the three-dimensional stereoscopic image is a sphere, an optimum sighting distance d is obtained in the formula of:

$$\begin{cases} Dout = Din = D \\ d = 6D, \end{cases}$$

wherein Dout represents a depth of field out of a screen, Din represents a depth of field into the screen, and D represents a radius of the sphere.

2. The method according to claim 1, wherein the step of adjusting the size of the three-dimensional stereoscopic image according to the sighting distance comprises:
   judging whether a difference between the sighting distance and the optimum sighting distance is within a predetermined range;
   maintaining the three-dimensional stereoscopic image when the difference is within the predetermined range, and adjusting the size of the three-dimensional stereoscopic image according to the optimum sighting distance when the difference is not within the predetermined range.

3. The method according to claim 1, wherein the step of adjusting the size of the three-dimensional stereoscopic image according to the sighting distance comprises:
   judging whether the sighting distance is equal to the optimum sighting distance;
   maintaining the three-dimensional stereoscopic image when they are equal, otherwise adjusting the size of the three-dimensional stereoscopic image according to the optimum sighting distance when they are unequal.

4. The method according to claim 3, wherein the step of adjusting the size of the three-dimensional stereoscopic image according to the optimum sighting distance comprises:
   comparing the sighting distance with the optimum sighting distance in size, wherein,
   scaling up the three-dimensional stereoscopic image according to a scaling formula when the sighting distance is larger than the optimum sighting distance; and
   scaling down the three-dimensional stereoscopic image according to the scaling formula when the sighting distance is smaller than the optimum sighting distance.

5. The method according to claim 2, wherein the step of adjusting the size of the three-dimensional stereoscopic image according to the optimum sighting distance comprises:
   comparing the sighting distance with the optimum sighting distance in size, wherein,
   scaling up the three-dimensional stereoscopic image according to a scaling formula when the sighting distance is larger than the optimum sighting distance; and
   scaling down the three-dimensional stereoscopic image according to the scaling formula when the sighting distance is smaller than the optimum sighting distance.

6. The method according to claim 5, wherein the scaling formula is: Scaling factor=Sighting Distance/Optimum Sighting Distance.

7. An apparatus for adjusting a stereoscopic image, comprising:
   a receiver configured to receive and display a three-dimensional stereoscopic image; and
   a detector configured to transmit a sensing signal and to obtain a sighting distance between a display terminal and a user according to the sensing signal; and
   a processor configured to adjust the size of the three-dimensional stereoscopic image according to the sighting distance;
   wherein when the three-dimensional stereoscopic image is a sphere, an optimum sighting distance d is obtained in the formula of:

$$\begin{cases} Dout = Din = D \\ d = 6D \end{cases},$$

wherein Dout represents a depth of field out of a screen, Din represents a depth of field into the screen, and D represents a radius of the sphere.

8. The apparatus according to claim 7, wherein the processor is configured:
   to judge whether a difference between the sighting distance and the optimum sighting distance is within a predetermined range, to maintain the three-dimensional stereoscopic image when the difference is within the predetermined range, and to adjust the size of the three-dimensional stereoscopic image according to the optimum sighting distance when the difference is not within the predetermined range; and
   to judge whether the sighting distance is equal to the optimum sighting distance, to maintain the three-dimensional stereoscopic image when they are equal, otherwise to adjust the size of the three-dimensional stereoscopic image according to the optimum sighting distance when they are unequal.

9. The apparatus according to claim 7, wherein the processor is configured:
   to compare the sighting distance with the optimum sighting distance in size to obtain a comparison result;
   to scale up the three-dimensional stereoscopic image according to a scaling formula when the comparison result indicates that the sighting distance is larger than the optimum sighting distance; and
   to scale down the three-dimensional stereoscopic image according to the scaling formula when the comparison result indicates that the sighting distance is smaller than the optimum sighting distance.

10. A system for adjusting a stereoscopic image, comprising:
    a display terminal configured to receive and display a three-dimensional stereoscopic image, to transmit a sensing signal and to obtain a sighting distance according to the sensing signal to adjust the size of the three-dimensional stereoscopic image; and
    stereoscopic glasses configured to receive the sensing signal and to return a feedback signal of the sensing signal to the display terminal;
    wherein when the three-dimensional stereoscopic image is a sphere, an optimum sighting distance d is obtained in the formula of:

$$\begin{cases} Dout = Din = D \\ d = 6D \end{cases},$$

wherein Dout represents a depth of field out of a screen, Din represents a depth of field into the screen, and D represents a radius of the sphere.

11. The system according to claim 10, wherein the display terminal comprises:
    a distance sensor configured to transmit the sensing signal to the stereoscopic glasses and to receive the feedback signal returned from the stereoscopic glasses; and
    a processor configured to calculate an interval of time between transmitting the sensing signal and receiving the feedback signal by the distance sensor to obtain the sighting distance, and to adjust the size of the three-dimensional stereoscopic image according to the sighting distance.

12. The system according to claim 10, wherein the stereoscopic glasses comprise:
    a distance sensor configured to detect a sighting distance between a display terminal and a user; and
    a processing device configured to send out prompt information according to a result of comparing the sighting distance with the optimum sighting distance to prompt the user to adjust the sighting distance.

13. The system according to claim 12, wherein the processing device comprises:
    a calculator configured to calculate a difference between the sighting distance and the optimum sighting distance; and
    a voice device configured to send out a voice prompt of the difference when the difference is out of a predetermined range or the difference is not zero.

14. The system according to claim 12, wherein the processing device comprises:
- a calculator configured to calculate a difference between the sighting distance and the optimum sighting distance; and
- a display device configured to display the difference when the difference is out of a predetermined range or the difference is not zero.

* * * * *